United States Patent
Espinasse et al.

(10) Patent No.: US 10,641,065 B2
(45) Date of Patent: May 5, 2020

(54) DEPRESSURISATION METHOD AND APPARATUS FOR SUBSEA EQUIPMENT

(71) Applicant: FORSYS SUBSEA LIMITED, London (GB)

(72) Inventors: Philippe Francois Espinasse, Bihorel (FR); Thomas Parenteau, Paris (FR); Antoine Marret, Paris (FR)

(73) Assignee: FORSYS SUBSEA LIMITED (GB)

( * ) Notice: Subject to any disclaimer, the term of this patent is extended or adjusted under 35 U.S.C. 154(b) by 0 days.

(21) Appl. No.: 16/095,992

(22) PCT Filed: Apr. 25, 2017

(86) PCT No.: PCT/GB2017/051146
§ 371 (c)(1),
(2) Date: Oct. 24, 2018

(87) PCT Pub. No.: WO2017/187154
PCT Pub. Date: Nov. 2, 2017

(65) Prior Publication Data
US 2019/0136671 A1 May 9, 2019

(30) Foreign Application Priority Data
Apr. 29, 2016 (GB) .................................. 1607492.4

(51) Int. Cl.
*E21B 43/013* (2006.01)
*F16L 55/26* (2006.01)
(Continued)

(52) U.S. Cl.
CPC ............ *E21B 43/013* (2013.01); *E21B 43/01* (2013.01); *F16L 55/26* (2013.01); *F16L 2101/20* (2013.01); *F16L 2101/70* (2013.01)

(58) Field of Classification Search
CPC combination set(s) only.
See application file for complete search history.

(56) References Cited

U.S. PATENT DOCUMENTS

| 3,562,014 A | 2/1971 | Childers et al. |
| 4,589,434 A | 5/1986 | Kelley .............................. 137/1 |

(Continued)

FOREIGN PATENT DOCUMENTS

| WO | WO 01/56714 A1 | 8/2001 |
| WO | WO 2008/100943 A2 | 8/2008 |

(Continued)

OTHER PUBLICATIONS

International Search Report dated Jun. 30, 2017 in corresponding PCT International Application No. PCT/GB2017/051146.
(Continued)

*Primary Examiner* — Kyle Armstrong
(74) *Attorney, Agent, or Firm* — Ostrolenk Faber LLP (57) ABSTRACT

A method for reducing the pressure of fluid within subsea equipment. The method includes the steps of: (a) providing a pipe, (b) laying the pipe on the sea floor, (c) providing a connector, (d) connecting the pipe to the subsea equipment via the connector, and (e) extracting fluid from the subsea equipment through the connector and into the pipe. Apparatus for reducing the pressure of fluid within subsea equipment by extracting fluid from the subsea equipment.

5 Claims, 5 Drawing Sheets

(51) Int. Cl.
*E21B 43/01* (2006.01)
*F16L 101/20* (2006.01)
*F16L 101/70* (2006.01)

(56) References Cited

U.S. PATENT DOCUMENTS

| | | | | |
|---|---|---|---|---|
| 5,842,816 | A | 12/1998 | Cunningham | 405/170 |
| 8,430,169 | B2* | 4/2013 | Stoisits | E21B 37/06 |
| | | | | 166/344 |
| 8,469,101 | B2* | 6/2013 | Fowler | E21B 43/01 |
| | | | | 166/275 |
| 9,080,411 | B1 | 7/2015 | Lugo | 166/344 |
| 9,435,185 | B2* | 9/2016 | Wright | B01D 19/0042 |
| 2002/0129641 | A1 | 9/2002 | Tucker et al. | 73/49.5 |
| 2006/0108120 | A1 | 5/2006 | Saucier | 166/344 |
| 2010/0047022 | A1 | 2/2010 | Le Moign | 405/184.1 |
| 2010/0071775 | A1 | 3/2010 | Ratcliffe | 137/12 |
| 2013/0025632 | A1 | 1/2013 | Hatton | 134/8 |

FOREIGN PATENT DOCUMENTS

| | | |
|---|---|---|
| WO | WO 2010/151661 A2 | 12/2010 |
| WO | WO 2011/026801 A1 | 3/2011 |
| WO | WO 2011/057369 A1 | 5/2011 |
| WO | WO 2012/149620 A1 | 11/2012 |
| WO | WO 2016/028158 A1 | 2/2016 |

OTHER PUBLICATIONS

Written Opinion dated Jun. 30, 2017 in corresponding PCT International Application No. PCT/GB2017/051146.
Combined Search and Examination Report dated Oct. 28, 2016 in corresponding United Kingdom Patent Application No. 1607492.4.

* cited by examiner

DEPRESSURISATION METHOD AND APPARATUS FOR SUBSEA EQUIPMENT

CROSS-REFERENCE TO RELATED APPLICATIONS

The present application is a 35 U.S.C. §§ 371 national phase conversion of PCT/GB2017/051146, filed Apr. 25, 2017, which claims priority to United Kingdom Patent Application No. 1607492.4, filed Apr. 29, 2016, the contents of which are incorporated herein by reference. The PCT International Application was published in the English language.

This invention relates to a method for reducing the pressure of fluid within subsea equipment. It also relates to apparatus for the remediation of hydrate by reducing the pressure of fluid within subsea equipment, a method for connecting the apparatus to subsea equipment, and a method of deploying the apparatus.

BACKGROUND

When fluid is extracted from a subsea oil and gas well, the fluid produced is normally conveyed from the wellbore to a production facility, for example a Floating Production Storage and Offloading vessel (FPSO) located on the surface of the ocean (also known as topside), via various items of subsea equipment. Typically, the subsea equipment includes a Christmas Tree, which is an assembly of valves, spools and pressure gauges fitted to the wellhead to control production.

During the production of fluid from the subsea oil and gas well, the produced fluid is transported through pipelines which may comprise two parts, (i) a flowline, which is the portion of the pipeline located on the seabed and which transports the produced fluids from the wellhead either to a manifold or directly to the topside (for example when using a SCR (Steel Catenary Riser)); and (ii) a riser, which is the portion of the pipeline which extends from the seabed to the production facility. In order to gather the production of several wells located in the same area and convey the produced fluid through one flowline a manifold may be used. The manifold is normally connected to the flowline on the one side and to the Christmas Tree on the other side, via a jumper (ie a flexible or rigid section of pipe, also known as a spool or flying lead, which normally has a similar diameter to the flowline and/or the Christmas Tree bore).

Typically, the fluid produced from the subsea oil and gas well is a mixture of hydrocarbons, gases and water. In the cold and high pressure environment which is usually experienced near a subsea oil and gas well, the water may react with gaseous molecules ($H_2S$, $CO_2$ or $CH_4$) to form solid components known as hydrates. The formation of hydrates in subsea equipment can restrict the flow of produced fluid through that equipment. In the worst cases, this can lead to the blockage of the flow through the subsea equipment, as well as damage to pumps and/or valves which may cause them to stop working. This may happen in particular during a production shut down where the fluids cool down into the hydrate formation zone. Several methods have been developed for preventing or managing hydrate formation during the production operation. However, these known methods all have drawbacks.

A known process for attempting to solve the problem of hydrate formation involves replacing the hydrate prone fluid with dead oil or equivalent and deploying a tool called a pig inside the flowline to displace the hydrate prone fluid. The pig is transported along the flowline using fluid pressure. In order to perform this operation, the wellheads to which the pipelines are connected need to be isolated from each pipeline section. The pipelines are then connected to one another so as to form a loop. The pig is then launched from one end of the loop and recovered at the other end of the loop. A disadvantage of this operation is that it is limited to use in pipelines and cannot be utilised to remove hydrates from manifolds or Christmas Trees.

It is also known to use a chemical method for alleviating hydrate deposition at the beginning of production from a subsea oil and gas well. Chemicals such as methanol or methyl ethylene glycol may be injected into subsea equipment, more particularly near a wellhead or manifold, in order to inhibit hydrate formation. However, a drawback of this process is that because hydrate deposits are not porous the chemicals cannot penetrate and break up existing hydrate deposits. Thus, this chemical method does not provide a complete solution, especially when the hydrate is already formed.

One of the parameters that is important in allowing hydrate formation is temperature, ie a low temperature is needed. Thus, in addition to the mechanical and chemical methods described above, a further option is to maintain the temperature inside subsea equipment during production above the temperature required for hydrate formation at the particular operating pressure. This can be done either by insulating and/or heating the subsea equipment. Again, a disadvantage of this operation is that whilst it can be utilised in pipelines it is not practical to use it in areas such as manifolds or Christmas Trees.

Since another important parameter in hydrate formation is pressure, ie a high pressure is required, a further option for limiting the formation of hydrates is to reduce the pressure in the subsea equipment. In order to depressurise (ie reduce the pressure in) subsea equipment, the highly pressurised fluid in that equipment can be extracted through coiled tubing. This process requires the use of a dedicated vessel on the surface of the sea (also known as a topside intervention vessel), from which the coiled tubing is deployed. The pressurised fluid is then transported through the coiled tubing to the vessel. This can be done either under the pressure already in the system, or by the use of a pump. Once the hydrates have been removed from the pipeline, the fluid in the vessel is then reinjected into the pipeline. Drawbacks of this process include that the equipment required to carry it out is expensive and not always available. Also, it can be technically difficult to return the fluid to the flowline. In addition, the fact that pressurised fluid is transported onto a vessel necessitates the detailed consideration of health and safety aspects, especially regarding the storage of flammable oil and gas hydrocarbons on the vessel, which can be time-consuming and costly for the operator.

U.S. Pat. No. 4,589,434 describes an apparatus and method for preventing formation of hydrates in subsea pipelines. This patent is particularly concerned with the prevention of hydrate formation rather than dissociating hydrates which have already been formed. The hydrates in question are those formed as a result of hydrostatic pressure in vertical pipeline sections which are used to transport fluid from a satellite platform to a central platform. The apparatus comprises a reservoir which is in permanent fluid communication with the pipeline. The level of fluid in the reservoir is controlled by pressure of a gas in the reservoir. During normal use, the reservoir is substantially filled with gas. When flow of fluid in the pipeline is stopped, in order to try to prevent formation of hydrates in the vertical pipeline sections as a result of hydrostatic pressure fluid is allowed to flow into the reservoir by reducing the pressure of gas in the reservoir. This is designed to reduce the pressure in the vertical pipeline sections to a level below that required for hydrate formation. The apparatus described in this patent has a number of drawbacks. The reservoir is complex to install and is a heavy load, meaning that installation requires a dedicated vessel with a large crane. A foundation in the form of a pile driven into the sea floor is therefore needed. The large size of the reservoir also means that it is subject to wave motion whilst entering the splash zone. The column of fluid in the reservoir also induces a high hydrostatic pressure. In addition, the fluid is extracted via a riser to the topside.

US patent application publication no 2010/0047022A1 relates to the removal of hydrate plugs from subsea pipelines using depressurisation of the pipeline. However, the procedure involves making a fluid connection via a riser from a topside vessel to the subsea pipeline, as well as storage of the fluid on that vessel. As noted above, such a connection with the fluid from a wellbore means that complex health and safety implications need to be considered when performing such a procedure. A further disadvantage of this method is that the fluid connection to the topside vessel means that there is a column of fluid inducing high hydrostatic pressure at the bottom of the column of fluid.

International publication no WO 2010/151661 A2 describes a system for sampling well production fluids. This system is also mentioned as being used to remove gas hydrate blockages in flow lines. This is understood to be for removing blockages in narrow bore sections of subsea equipment (ie flow lines) by the permanent removal of relatively small quantities of fluid from those lines. Injection of hydrate inhibitors such as methanol is also described. A drawback of this system is that the volume removed is small (5 litres), meaning that it is not efficient enough for hydrate remediation.

International publication no WO 2012/149620 A1 relates to apparatus for depressurising a Christmas Tree in order to prevent hydrate formation or to remove hydrates. The apparatus comprises a pump which extracts fluid from the Christmas Tree and reintroduces that fluid at a different point in the Christmas Tree or other subsea equipment. Disadvantages of this apparatus include that it means that there is a column of fluid inducing high hydrostatic pressure at the bottom of the column of fluid, and that the fluid is extracted via a riser to the topside.

The present invention therefore seeks to address the problem of providing an improved method for reducing the pressure of fluid within subsea equipment, as well as improved apparatus for the remediation of hydrate in subsea equipment, in particular by providing an apparatus that is easier to deploy and recover, is cost effective by using commonly used equipment, and provides improved safety and efficiency. This invention also seeks to provide an apparatus and method for the remediation of hydrate in subsea equipment including pipelines, Christmas Trees and manifolds.

STATEMENT OF INVENTION

According to one aspect of the invention, there is provided a method for reducing the pressure of fluid within subsea equipment, the method comprising the steps of:
(a) providing a pipe,
(b) laying the pipe on the sea floor,
(c) providing a connector,
(d) connecting the pipe to the subsea equipment via the connector, and
(e) extracting the fluid from the subsea equipment through the connector and into the pipe.

The method does not involve the use of a riser for extracting the fluid to a topside vessel, thereby avoiding the high hydrostatic pressure that this can generate in the resulting column of fluid (for example, a 2000 m fluid column in the prior art can result in a pressure of 200 bar (20 MPa)). Instead, it allows fluid from the subsea equipment to be extracted into the pipe, which is generally laid on the sea floor, in order to reduce the pressure of the fluid remaining in the subsea equipment such that any hydrate dissociates. The use of a pipe means that the apparatus of the invention is easy to install compared to, for example, a large tank, whilst providing a similar storage volume (100 litres to several thousand litres or more depending on the length of the pipe). In addition, by not requiring the fluid (ie flammable oil and gas hydrocarbons) to be extracted to the topside, improved safety is provided by removing the risk associated with topside extraction and storage.

More particularly, the pipe may be a flexible pipe, rigid pipe, umbilical with a fluid channel or a collapsible pipe. In particular, the pipe is a flexible pipe. The pipe is generally rated at least at the production pressure of the fluid. More particularly, a pump may be provided which is connected to the pipe, and step (e) may comprise pumping the fluid from the subsea equipment through the connector and into the pipe. This allows the fluid in the pipe to be pressurised and provides further depressurisation of the fluid in the subsea equipment. In particular, a pump may be provided which is connected to the pipe, and the method additionally comprises after step (e) the following step: (f) pumping the fluid in the pipe through the connector in order to return it to the subsea equipment. Once the fluid has been returned to the subsea equipment, the apparatus can be safely recovered to a topside vessel. More particularly, a pig may be provided within the pipe and step (f) may comprise pushing the pig along the pipe from a pig starting point to a pig finishing point. This use of the pig provides an efficient means for returning the extracted fluid to the subsea equipment once any hydrate within the subsea equipment has dissociated. In particular, step (e) may additionally comprise measuring the amount of fluid extracted from the subsea equipment through the connector and into the pipe. More particularly, step (e) may additionally comprise adding a hydrate formation inhibitor to the fluid being extracted.

According to a second aspect of the invention, there is provided apparatus for reducing the pressure of fluid with subsea equipment by extracting fluid from the subsea equipment, the apparatus comprising:
(a) a pipe for containing fluid extracted from the subsea equipment,
(b) a connector for providing fluid communication between the fluid in the subsea equipment and the pipe,
(c) a valve for controlling the fluid communication between the subsea equipment through the connector and into the pipe.

This apparatus is easier than prior art apparatus to install and recover. More particularly, the subsea equipment may be on the sea floor. In particular, in step (a) the pipe may be laid on the sea floor. The apparatus may be for use in a method as described above.

More particularly, the apparatus may additionally comprise:

(d) a pig within the pipe which is transportable along the pipe in order to return the fluid in the pipe through the connector to the subsea equipment, and (e) a pump for transporting the pig along the pipe.

In particular, the pipe has a first downstream end and a second upstream end. The terms upstream and downstream are used as defined below. More particularly, the pipe comprises a pig starting point, and a pig finishing point which is downstream from the pig starting point, the pig being transportable between the pig starting point and the pig finishing point. This use of the pig in this way provides an efficient means for returning the extracted fluid to the subsea equipment once any hydrate within the subsea equipment has dissociated. In particular the apparatus comprises a flexible pipe for containing fluid extracted from the subsea equipment.

In particular, an extraction pump for extracting fluid from the subsea equipment may be provided downstream of the pipe. The extraction pump is generally used once the pressure of fluid within the pipe and subsea equipment has equalised, allowing the fluid in the pipe to be pressurised and providing further depressurisation of the fluid in the subsea equipment.

In particular, a second closable opening, for example a second valve, may be provided upstream of the extraction pump and downstream of the pipe. This second closable opening can be closed when the pipe is full of fluid and pressurised in order to allow dissociation of any hydrate in the subsea equipment.

In particular, the pump for transporting the pig may be provided upstream of the pipe. More particularly, the pump for transporting the pig may be a water pump and may comprise a water inlet for drawing water, in particular water from the sea, into the pump so that it can be pumped downstream. This provides an effective means for transporting the pig along the pipe. In particular, a third closable opening, for example a third valve, may be provided upstream of the pipe and downstream of the pump for transporting the pig. This third closable opening can be closed when the pig has reached the pig finishing point.

More particularly, a flow meter may be provided upstream of valve. In particular, the apparatus may comprise an injector for adding a hydrate formation inhibitor to the fluid.

An advantage of the apparatus of the invention is that deployment can be carried out using one vessel. This saves both time and cost compared to prior art methods. Once the pipe has been laid on the sea floor, the rest of the apparatus is small and light enough to be lifted by the type of crane normally provided on pipe laying vessels or a light construction vessel (eg construction vessel equipped with lifting apparatus for the lifting of light load, generally inferior to 200 tonnes).

BRIEF DESCRIPTION OF THE DRAWINGS

This invention will be further described by reference to the following Figures which are not intended to limit the scope of the invention claimed, in which:

DETAILED DESCRIPTION

It has been surprisingly found by the inventors that improved removal of hydrates from subsea equipment can be provided using the methods and apparatus of the invention. Many of the existing methods of removing hydrates involve the use of dedicated vessels. For example, a first dedicated vessel is required for the deployment and recovery of the apparatus used in these known methods, whilst a second dedicated vessel is needed when carrying out the method (ie the depressurisation phase). This second vessel needs to be capable of recovery and on-board storage of the depressurised production fluid from the subsea equipment. The availability of such vessels can be limited, and in addition their use adds cost. The methods and apparatus of the invention do not require a specially adapted vessel and can therefore reduce costs. Instead, they can be laid and operated by the same single vessel, which does not need to be capable of storing the production fluid from the subsea equipment.

In the context of the invention, the term "downstream" is used to refer to a part of the path of the fluid through the apparatus which is closer to the connection to the subsea equipment provided by the connector. The part of the apparatus which connects to the subsea equipment can also be referred to as the proximal end of the apparatus. Similarly, the term "upstream" is used to refer to a part of the path of the fluid through the apparatus which is further from the connection to the subsea equipment provided by the connector. The part of the path of the fluid which is furthest from the connection to the subsea equipment can also be referred to as the distal end of the apparatus. The subsea equipment may, for example, be a Christmas Tree or manifold. The subsea equipment may also be an Inline Tee (ILT), Pipeline End Termination (PLET or FLET for Flowline End Termination).

In relation to the apparatus, the pipe may comprise only one internal cavity for fluid. Optionally the pipe can comprise several cavities. When there are several cavities, they can be filled separately or together, to adapt the volume as required. More particularly, the apparatus may comprise a flexible pipe for containing fluid extracted from the subsea equipment.

As noted above, the pipe used in the invention may be a flexible pipe, rigid pipe, umbilical with a fluid channel or collapsible pipe. Each of these types of pipe are described in more detail below.

A flexible pipe generally comprises at least one layer of wound wire. This can allow the flexible pipe to bend relatively easily and to be reeled with minimal plastic deformation. In particular, the flexible pipe may be bonded or unbonded. A bonded pipe is normally a flexible pipe in which steel reinforcement is provided within and bonded to an (optionally Vulcanized) elastomeric material. A textile (eg a woven fabric) may be included in the structure in order to provide additional structural reinforcement or to separate elastomeric layers. In an unbonded pipe, the pipe construction normally comprises separate unbonded polymeric and metallic layers, which allows relative movement between layers. In particular, the flexible pipe may comprise a carcass element (ie the innermost layer of the pipe) which may be configured to resist the differential of pressure between the interior and exterior of the flexible pipe. More particularly, the carcass may be an interlocked metallic or composite construction that can be used as the innermost layer to prevent, totally or partially, collapse of the internal pressure sheath or pipe due to pipe decompression, external pressure, tensile armour pressure, and mechanical crushing loads.

More particularly, the flexible pipe may comprise, from the exterior to the interior:

A polymeric external sheath (called the external sheath).

A retaining layer wound around an external tensile pressure armour layer. The retaining layer may comprise several strips, tapes or unitary elements wound in a short pitch around the external armour layer. This winding is generally contiguous or overlapping in order to increase the capacity to absorb the radial swelling forces. The unitary elements of the retaining layer have a high longitudinal tensile strength along their longitudinal axis.

An external tensile pressure armour layer.

An internal tensile pressure armour layer wound in the opposite direction to the external tensile pressure armour layer. The armour layers are obtained by the long pitch winding of a series of metal or composite yarns, having a generally substantially rectangular cross section. The yarns may alternatively have a circular or complex geometry cross section, for example of the self-interlocking T type. The pipe could also comprise one or more additional armour pairs. The armour layer is called external because it is the final layer here, starting from the interior of the pipe, before the external sheath. The retaining layer is generally wound around the external layer, but the invention would also apply in the case of a retaining layer inserted between two tensile pressure armour layers.

A pressure armour layer for absorbing the radial forces generated by the pressure of the fluid conveyed, A polymer internal sealing sheath An internal carcass for absorbing the radial crushing forces.

More particularly, in some embodiments the pressure armour layer can be eliminated, provided that the helix angles of the yarns constituting the armour layers are close to 55 degrees and in opposite directions. The pressure vault (a.k.a. pressure armour layer) may be configured to be resistant to bursting. The pressure armour layer is normally a structural layer with a lay angle close to 90 degrees, which increases the resistance of the flexible pipe to internal and external pressure and mechanical crushing loads. The lay angle is the angle between the wire forming the pressure armour and the axis of the pipe. In particular, the layer may also structurally support the internal pressure sheath and typically consists of an interlocked (ie the wire that forms the pressure armour is shaped such that each winding around the pipe locks to the previous adjacent winding) metallic or composite construction, which may be backed up by a flat metallic spiral layer. More particularly, the internal diameter of the flexible pipe may generally be less than 700 mm, more particularly less than 100 mm.

The flexible pipe may comprise several lengths of pipe which are connected together. In particular, the flexible pipe may have a Minimum Bending Radius (MBR) that is less than 7 times its internal diameter. More particularly, the flexible pipe may be as described in API Recommended Practice 17B (5$^{th}$ Edition, May 2014) and API Specification 17J (4$^{th}$ Edition, May 2014).

A rigid pipe is generally made from a sheet of metal having a tube shape. Rigid pipes can be reeled, but this normally results in plastic deformation of the pipe. The reels for rigid pipes are normally larger (for example, around 21 m in diameter) than those for flexible pipes (for example, around 5 m in diameter). In particular, the rigid pipe may have any suitable thickness or dimension, typically intended to achieve a certain degree of flexibility in the formed pipeline, especially reel-ability to assist with reel-laying. The rigid pipe may comprise a main metal tube typically formed of steel, in particular carbon steel. It may also include a corrosion-resistant alloy or any other suitable metal. The main metal tube aims to provide resistance to hydrostatic pressure, and/or internal pressure of the hydrocarbon fluid. The main metal tube may be any length, including typical stalk lengths of either 12 m or 24 m, but possibly up to 1 km or longer. The main metal tube may be any internal diameter from 10 cm to 70 cm or bigger. The main metal tube may be any thickness from 5 mm to 50 mm or bigger. The main metal tube may be formed by extrusion. The main metal tube may be formed from metal ingots which are pierced, for example by broaching, elongated and calibrated, for example by rolling. The main metal tube may be formed from sheet bended generally with U-shape break press then O-shape break press, eventually expanded with an expander, and longitudinally seam welded. The main metal tube may be formed from the assembly of a series of main metal tube stalk butts welded together.

The rigid pipe may comprise a liner on the inner surface of the main metal tube. The liner aims to provide an effective corrosion-resistant barrier to the internal surface of the pipeline even in an aggressive single, dual and multiphase hydrocarbon environment at temperatures up to 130° C. and at high operating pressures. The liner may be formed of a metal, especially a corrosion resistant alloy (CRA) such as an alloy 316L, Super 13 Cr, 22 Cr duplex, 25 Cr duplex, Alloy 28, Alloy 825, Alloy 2550, Alloy 625, Alloy C-276, or any other suitable corrosion resistant alloy. The thickness of the metallic liner can be in the range 0.5 mm to 10 mm, or greater. The liner may be made from polymers which have high thermal and chemical resistance for example a semi-crystalline fluorinated polymers such as Polyvinylidene fluoride (PVDF), Polytetrafluroethylene (PTFE), Perfluoro-alkoxy (PFA), and Poly(Ethylene Chlorotrifluoroethylene) (ECTFE), or non-fluorinated polymers such as thermoplastic polyurethane (PU), polyethylene (PE), cross linked polyethylene (XLPE), polyamide (PA), Polyetheretherketone (PEEK), Polyamide-Imide (PAI), Polysulfone (PSF), Polyethersulfone (PES) and Polyphenylsulfone (PPSU), or a formulation comprising of a combination of two or more of these plastics designed to satisfy the working requirements of the pipeline into which it will be deployed as a corrosion barrier. The polymeric liner may be any thickness from 0.5 mm to 50 mm, or greater. The polymeric liner is preferably extruded.

The liner is normally bonded to the inner surface of the main metal tube of the rigid pipe. For this purpose, the liner can be pressurised from the inside, for example by injecting with a pump a pressurized fluid such as water or oil, so as to expand the liner circumferentially to form interference contact stress between the liner and the main metal tube. Generally during the expansion, the liner undergoes a plastic deformation while the main metal tube undergoes either an elastic or a plastic deformation, depending on the manufacturing process. One example of this comprises inserting the liner inside the main metal tube, and expanding the liner radially so that it comes into contact with the main metal tube, and then the main metal tube outer diameter will also expand together with the liner to a pre-determined strain level such that, following relaxation of the internal pressure, an interference contact stress between the liner and the main metal tube remains. Such a rigid pipe is generally known as a Mechanically Lined Pipe (MLP). When the liner is formed from metal, the liner can also be metallurgically bonded to the main metal tube. The liner can be metallurgically bonded at the extremities of the main metal tube or on the entire length, partially or entirely on the circumference of the main metal tube. The liner may be metallurgically bonded to the main metal tube by an electric resistance welding process, a pin laser welding process, a laser overlay welding process, or a laser overlay clad welding process, hot rolling, coextrusion, explosive bonding, or any other suitable welding process or combination of these processes.

An umbilical normally comprises a group of one or more types of elongate active umbilical elements, such as electrical cables, optical fibre cables and fluid conveying conduits, cabled together for flexibility and over-sheathed and/or armoured for mechanical strength in the same way as flexible pipe. Umbilicals are typically used for transmitting power, signals and fluids (for example for fluid injection, hydraulic power, gas release, etc.) to and from a subsea installation. API (American Petroleum Institute) 17E "Specification for Subsea Umbilicals", third edition, July 2003, provides standards for the design and manufacture of such umbilicals. Umbilicals can be reeled, but this normally results in plastic deformation of the pipe. The reels for umbilicals are normally a similar size to those for flexible pipes or smaller than those for rigid pipes (for example, around 5 m in diameter). In the present case, the umbilical may comprise at least one fluid conveying conduit. The at least one fluid conveying conduit may be made of metal tube in the same way as the rigid pipe. The main metal tube aims to provide resistance to hydrostatic pressure, and/or internal pressure of the hydrocarbon fluid. In umbilicals, and different to rigid pipes, the metal tube inner diameter may be from 1 cm to 10 cm. The metal tube may be any thickness from 1 mm to 10 mm or bigger. The metal tube may be any length, including typical stalk lengths of either 12 m or 24 m, but possibly up to 1 km or longer. The metal tube can be manufactured in the same way as the rigid pipe's main metal tube. In the same way as the rigid pipe, the at least one fluid conveying conduit may comprise a liner on the inner surface of the main metal tube. The liner aims to provide an effective corrosion-resistant barrier to the internal surface of the pipeline even in an aggressive single, dual and multiphase hydrocarbon environment at temperatures up to 130° C. and at high operating pressures. The liner can be polymeric or metallic, as is the case for the rigid pipe.

More particularly, the flexible pipe, rigid pipe or umbilical may be configured to resist collapse under the hydrostatic pressure it would experience during normal use (ie the pressure differential between the interior and exterior of the pipe). A pipe configured in this way can be laid whilst it is empty (ie with only air inside). Thus, the pressure inside the pipe will be close to atmospheric pressure (1 bar). Connecting this pipe to the subsea equipment, where production fluid inside can be at a pressure higher than the atmospheric pressure, typically more than 20 bar or even more, the pressure differential causes the production fluid to flood into the empty pipe. This can mean that a pump may not be needed to transfer the fluid from the subsea equipment to the pipe. In particular, the flexible pipe, rigid pipe or umbilical may be resistant to a differential of pressure up to 300 bar (30 MPa) or more. For example, a pressure 1 bar (0.1 MPa) inside the flexible pipe, rigid pipe or umbilical (ie atmospheric pressure) and 300 bar (30 MPa) or more at the seabed. Resistance to the collapse is defined as the volume inside the flexible pipe, rigid pipe or umbilical varying by less than 10% under the differential of pressure.

Alternatively, the pipe may be configured to collapse under the hydrostatic pressure it would experience during normal use, but recover its original form when the inner cavity is pressurised. Such a pipe is known as a collapsible pipe. A collapsible pipe can normally be reeled in the same way as a flexible pipe. For such a collapsible pipe, a pump may be used to inject fluid into the pipe. In contrast with a pipe which is resistant to collapse, when using a collapsible pipe in the apparatus of the invention the pressure inside the pipe when the pipe is empty is generally the same as the external environment. The pressure can be the same or greater than the external environment after extraction of the fluid into the pipe, for example if the fluid is pressurised into the pipe using the extraction pump. Since, as a rule of physics, hydrostatic pressure underwater increases by 1 bar for every 10 m increase in depth, at 2000 m the collapsible pipe could be under a pressure of around 200 bar. Since the production fluid in the subsea equipment can be under similar pressure, a pump may be needed to transfer fluid from the subsea equipment to the collapsible pipe. This then increases pressure in the collapsible pipe. The collapsible pipe may comprise at least one fabric or metallic core; and at least one layer of plastic which is preferably on the inner surface of the fabric core. The fabric core can comprise one or more layers of very high strength fibres. The fabric core may comprise longitudinal and radial fibres. The fibres may comprise the same material, having similar tensile and elongation properties, or may be formed from different materials having different tensile and elongation properties. These fibres may be Aramid, Carbon, Polyester, steel (cords), some other form of fibre or indeed a combination of two or more different fibres. The fabric core may be created by mechanically weaving the fibres together so as to form a continuous circular tube of the desired diameter. The fibre core may, for instance, comprise between 1,000 and 2,000 fibre yarns, with each yarn having between 5 and 15 fibres and between 5,000 and 25,000 dtex. The fabric may be woven primarily in the 0 degree and 90 degree directions so as to provide the highest degree of both axial and radial strength. For example, the fibres used for the axial and radial weaving may be of a different type so as to, for instance, provide the maximum possible longitudinal tensile strength with a relatively large degree of capability for radial elasticity.

Alternatively, the reinforcement layer may be made of armour plies assembled in at least two layers set at opposite angles. The armour plies may be wound helically about a longitudinal axis A-A at a balance lay angle of 55°. To do this, the plies may be wound in opposite senses and with complementary lay angles so as to balance the stresses developed in the collapsible pipe. The armour plies may also be wound with a short pitch at a lay angle of 80° and wound at a lay angle of less than 55° so as to balance the said stresses. Depending on the structure of the collapsible pipe, the first two armour plies may be reinforced in the same direction in order to limit gas diffusion, so that they overlap each other and produce what is called masking; this can also be achieved by one or more armour plies wound with a very short pitch (lay angle of about 80°), which could modify the lay angle indicated above so as to balance the stresses in the structure. The armour strips (or plies) may be covered with a thermoplastic in order to ensure bonding on or between the various layers. The armour plies and/or the metal bands may be made either from steel strip of small thickness (less than 5 mm and preferably less than 3 mm) and coated with a thermoplastic, or from thermoplastic strips extruded around plies of reinforcing fibres of the carbon, glass or steel type. It is also possible to produce a mixture of types of armour plies in order to optimize the structure. The plastic covering will make it possible to obtain complete or partial consolidation by melting between all the layers of the collapsible pipe so as to prevent disorganization when the structure collapses.

For the collapsible pipe, the material of the layer of plastic may be selected to provide an effective corrosion resistant barrier to the internal surface of the pipeline even in an aggressive single, dual and multiphase hydrocarbon environment at temperatures up to 130° C. and at high operating pressures. The layer may be made from polymers which have high thermal and chemical resistance for example semi-crystalline fluorinated polymers such as Polyvinylidene fluoride (PVDF), Polytetrafluroethylene (PTFE), Perfluoroalkoxy (PFA), and Poly(Ethylene Chlorotrifluoroethylene) (ECTFE), or non-fluorinated polymers such as thermoplastic polyurethane (PU), polyethylene (PE), cross linked polyethylene (XLPE), polyamide (PA), Polyetheretherketone (PEEK), Polyamide-Imide (PAI), Polysulfone (PSF), Polyethersulfone (PES) and Polyphenylsulfone (PPSU), or a formulation comprising of a combination of two or more of these plastics designed to satisfy the working requirements of the pipeline into which it will be deployed as a corrosion barrier. A layer of plastic may be extruded onto the inner and/or outer surface of the fabric core. Typically, the plastic liner may be of a 2 to 6 mm thickness for small fabric core diameters (such as 10 cm to 20 cm) and of a 5 mm to 15 mm thickness for larger fabric core diameters (25 cm or more).

The collapsible pipe may comprise at least one inner plastic layer on the inner surface of the fabric core and at least one outer plastic layer on the outer surface of the fabric core. The at least one inner plastic layer may be designed to be adequate to provide an impermeable barrier in respect of the fluid and gaseous elements being conveyed through the pipeline whilst also retaining a high degree of flexibility as is required to enable the liner to be folded. Typically, the at least one inner plastic layer may be of a 2 to 5 mm thickness in a small diameter pipeline application (such as 10 cm to 20 cm) and of a 3 mm to 10 mm thickness is larger diameters (25 cm or more). The outer plastic layer may be designed to withstand the operating parameters of the collapsible pipe into which it will be deployed and also to provide an abrasive resistant layer to protect the inner plastic layer and fabric core during the installation procedure. The thickness of the outer plastic layer will typically be in the 2 to 5 mm range dependent upon the fabric core diameter.

Two rods may be placed on the internal surface of the inner plastic layer and preferably symmetrically with respect to the direction of collapse which is perpendicular to the longitudinal axis of the collapsible pipe. These rods may be designed so as locally to increase the stiffness, in order to control the shape of the inner plastic layer in the collapsed state or to maintain the geometry. The rods may include, within their thickness or as a core, at least one longitudinal reinforcement of the cable or tubing type, in order to fulfil precise functions such as, for example, the taking-up of the tensile forces.

The collapsible pipe may be of unbonded, bonded or partially bonded type, that is to say all the layers of the collapsible pipe are unbonded or all the layers of the collapsible pipe are bonded together or certain members of the collapsible pipe are locally bonded together.

In particular, the pipe may be configured to be resistant to bursting under the internal pressure (up to 300 bar (30 MPa) or more) and a differential of pressure that could vary from 0 to 200 bar (0 to 20 MPa) when pressure outside the pipe is inferior to the internal pressure. In particular, the internal volume of the pipe may be at least 100 litres, more particularly at least 500 litres. More particularly, the length of the pipeline may be from 1 m to 1 km, although it can be longer than this. This can be a single pipe length, or several pipes connected together.

As described above, the subsea equipment may be arranged on the sea floor and the pipe may be laid on the sea floor. More particularly, the pipe when laid on the sea floor may be substantially horizontal. In this context, substantially horizontal is used to mean that the pipe follows the relief of the sea floor.

More particularly, the pipe may have a first downstream end and a second upstream end. In particular, the pipe may be closed at one or both of its ends such that only the connector is in fluid communication with the pipe. In this way, ingress of sea water into the pipe during laying can be substantially prevented. More particularly, the connector may be provided at the first downstream end of the pipe, and the pipe may be closed at its second upstream end. The closure at the second upstream end of the pipe may comprise a valve. The pipe may be provided with a pig which is transportable along the interior of the pipe from a pig starting point to a pig finishing point. The pig starting point is generally upstream from the pig finishing point. In particular, the pig finishing point may be provided at the first end of the pipe and the pig starting point at the second end of the pipe. The pig finishing and pig starting points may comprise a retainer for limiting the movement of the pig to between the pig starting and pig finishing points. The retainer may comprise a section with a diameter narrower than that of the pig. The retainer may comprise cushioning material (eg shock absorbers) on its inner surface. The cushioning material could be in the form of a rubber coating or rubber strips, which could be provided on one or both ends of the pig. The narrower diameter section may form part of an end fitting on the pipe. The end fitting on the pipe (ie which closes the pipe) may be equipped with a valve which is closed to prevent sea water entering the pipe during laying. The valve can be fixed to the end fitting or integrated in the end fitting. Alternatively, the narrower diameter section may be a separate piece attached to the end fitting by a coupling, eg a flange. The narrower diameter section can be formed from a corrosion-treated metal, or a coating/lining such as those described above in relation to the rigid pipe. In this way, complex pig launching and pig receiving apparatus such as those depicted in WO 01/56714 A1 are not required. More particularly, the narrower diameter section may be provided at a downstream end of the pig finishing point and an upstream end of the pig starting point. This allows the pig to be retained in the pipe. The pipe may comprise a heater for heating the fluid within the pipe. In addition, the pipe may comprise thermal insulation. More particularly, the heating may be by Electrical Trace Heating (ETH) or by Direct Electrical Heating (DEH).

Pigs for cleaning pipelines normally have an external diameter slightly larger than the internal diameter of the pipeline to be cleaned (without waxy or hydrate deposits). The pig may be generally cylindrical in shape. The two opposing ends of the pig may be substantially flat or may be conical. Pigs may comprise a metallic body on which is mounted cups or discs. The body may be made of steel. The cups or discs may generally be made of a polymer such as polyurethane or urethane, or they can comprise a metal core with an external polymer disc. Alternatively, the pig can comprise a foam body with polyurethane wrapping on it.

The connector may comprise a pipe, more particularly a flying lead. More particularly, the flying lead may be fitted with a buoyancy aid. The pipe may be a flexible pipe or a flexible pipeline bundle (ie an arrangement of pipes within a larger pipe). In particular, the pipe may be capable of handling pressures of greater than 10 MPa (greater than 100 bar), more particularly greater than 30 MPa (greater than 300 bar). More particularly, the pipe may have an internal diameter of between 20 mm and 700 mm, more particularly between 20 mm and 200 mm, even more particularly between 25.4 mm and 101.4 mm (between 1 and 4 inches).

The valve may be provided upstream of the connector. The valve may be an on/off valve able to open and close rapidly in about 5 second or less. The valve may be controlled by an ROV or by hydraulic fluid provided via an ROV or umbilical. Upstream of the valve there may be provided an extraction pump. The extraction pump may be downstream of the pipe, and may be downstream of the pig finishing point. The extraction pump can be used to assist in extracting fluid from the subsea equipment. A pump may not be required during extraction when the pressure differential between the subsea equipment (for example, at 20 bar or more) and the pipe (for example, at the atmospheric pressure around 1 bar) is large enough. When the pressure differential is too low, a pump may be used. Alternatively, a pump may not be required initially, but may be used once the pressure differential has decreased. This can include increasing the pressure of fluid in the pipe in order to further reduce the pressure of fluid in the subsea equipment. In particular, the extraction pump may be capable of providing a flow rate of less than 4 litres per minute (less than 1 gallon per minute). The extraction pump may be capable of pumping fluid at a pressure of greater than 10 MPa (up to 100 bar), more particularly greater than 30 MPa (greater than 300 bar).

Upstream of the valve there may be provided a flow meter. The flow meter may be able to measure a minimum flow rate of 1 gallon per minute either for 100% gas, 100% liquid or any ratio of gas/liquid between these two extremes, for example 50%/50% gas/liquid. The flow meter may be downstream of the pipe. The flow meter may be downstream of the pig finishing point. The flow meter may be upstream of the extraction pump. In particular, the flow meter may be a multiphase flow meter. The flow meter allows the operator to measure the amount of fluid transferred from the subsea equipment to the pipe. A separate pressure measurement may be made. This can be important in ensuring that the required amount of inhibitor is injected.

Upstream of the valve there may be provided a second closable opening. The second closable opening may be downstream of the pipe. The second closable opening may be downstream of the pig finishing point. The second closable opening may be upstream of the extraction pump. The second closable opening may be upstream of the flow meter. The second closable opening may be a valve. The valve may be an on/off valve as described above. More particularly, the valve may be a choke valve. When the second closable opening is upstream of extraction pump and the flow meter, it may be connected to the pipe or the pig finishing point by a connector as described above. This second closable opening allows the operator to control the rate of fluid flow from the subsea equipment to the pipe, for example by adjusting the opening surface of the second closable opening, and therefore the rate of depressurisation of the subsea equipment. The second closable opening is normally closed after the pipe is flooded within the pressurised fluid from the subsea equipment. It allows the extraction pump to be turned off whilst maintaining the decreased pressure inside the subsea equipment. In this way, the melting of the hydrate plugs may be provided. The second closable opening thereby allows the decreased pressure to be maintained without stressing the pump by stopping it. It may be necessary to maintain this decreased pressure state for several minutes or hours.

The pump for returning fluid to the pipe may be provided upstream of the pipe, more particularly upstream of the pig starting point. The pump may be a water pump. The water pump may be capable of providing a flow rate of less than 4 litres per minute (less than 1 gallon per minute). The water pump may be capable of pumping fluid at a pressure of greater than 10 MPa (up to 100 bar), more particularly greater than 30 MPa (greater than 300 bar). More particularly, the water pump may comprise a water inlet. This inlet is for drawing water (normally sea water) into the pump so that it can be pumped downstream in order to return the fluid in the pipe through the connector to the subsea equipment. More particularly, the water pushes the pig from the pig starting point towards the pig finishing point. In particular, the water pushes the pig from the pig starting point to the pig finishing point.

Upstream of the pipe there may be provided a third closable opening. The third closable opening may be downstream of the pump for returning fluid to the pipe. The third closable opening may be in the form of a valve. The valve may be an on/off valve as described above.

One or more of the two pumps, three closable openings and the flow meter may be provided in a single unit. Such a unit is sometimes called a skid. Optionally, the two pumps, three closable openings and the flow meter may be provided in the single unit. The pipe may be u-shaped. This can make it easier to connect the pipe's first and second ends to the single unit or skid. Alternatively, the extraction pump, first and second closable openings and flow meter may be provided in one unit, and the water pump and third closable opening may be provided in another unit. This arrangement can allow the pipe to be laid in a substantially straight configuration (ie rather than a u-shape). The connections between the pipe and the skid can be direct connections between an end fitting on the pipe and the connection point on the skid. Alternatively, the connection between the end fitting on the pipe and the connection point on the skid can be via a flying lead (ie a flexible pipe). Thus, a first downstream flying lead may provide fluid connection between the downstream end of the pipe and the skid, and a second upstream flying lead may provide fluid connection between the upstream end of the pipe and the skid. The apparatus may comprise an umbilical which is connectable to a topside vessel. The umbilical may comprise a power supply. The umbilical may comprise a controller to allow a user to control the apparatus (eg from a topside vessel). Optionally, the apparatus does not require the use of a riser to such a vessel (ie it can be riserless).

The apparatus may comprise an injector for adding a hydrate formation inhibitor to the fluid. The inhibitor may be methanol or methyl ethylene glycol. In particular, the inhibitor may be added to the fluid in an amount of at least 30% by volume.

In relation to the method for reducing the pressure of fluid within subsea equipment using the apparatus as described above, step (e) may additionally comprise opening one or more valves within the subsea equipment in order to allow fluid to be extracted from the subsea equipment. After step (d), and prior to step (e), the method may additionally comprise, when present, the step of opening the closable opening (for example, the valve).

In step (e), extracting the fluid may comprise allowing the fluid in the subsea equipment to flow through the connector and into the pipe. Alternatively or additionally (eg subsequent to allowing the fluid to flow), in step (e) extracting the fluid may comprise pumping the fluid from the subsea equipment through the connector and into the pipe. An extraction pump as described above may be provided for this purpose.

Step (e) may additionally comprise measuring the amount of fluid flowing into the pipe. A flow meter as described above may be provided for this purpose. Step (e) may also comprise adding a hydrate formation inhibitor as described above to the fluid being extracted. The flow meter can thus be used to quantify the amount of hydrate formation inhibitor required (for example, the flow rate at which this needs to be added). This can further assist in inhibiting the formation of hydrates in the pipe. The flow meter can also be used to avoid excessive velocity of fluid into the pipe. Fluid temperature and pressure may be measured at a different part of the apparatus.

Extracting step (e) may be carried out until the pressure of fluid remaining in the subsea equipment has been reduced to a level at which any hydrate can dissociate. This pressure is typically from 1 bar to 10 bar, although it may be higher. At this stage, an optional accelerated dissociation treatment may be carried out. This may comprise adding a hydrate formation inhibitor to fluid in the subsea equipment, or by passing dead oil through the subsea equipment. This can be done, by a service line or an umbilical connected to the skid or directly connected to the subsea equipment. The fluid can be hydrate inhibitor as describe above, nitrogen, or hot dead oil. In this context, hot means above the hydrate dissociation temperature of around 20° C. Dead Oil is an oil that does not contain, at a pressure under 1 bar, any dissolved gas or volatile components. More particularly, the temperature of the dead oil may be between 20° C. and 50° C.

The method may comprise, after step (e), the step of: (f) pumping the fluid in the pipe through the connector in order to return it to the subsea equipment. In step (f), a pump for returning fluid in the pipe through the connector to the subsea equipment as described above may be provided. The pipe may be as defined above. As described above, the pipe may be provided with a pig finishing point, a pig starting point which is upstream from the pig finishing point and a pig which is transportable between the pig starting point and the pig finishing point. Step (f) may comprise pumping water downstream into the pipe. Step (f) may comprise pushing the pig from the pig starting point towards the pig finishing point with the pumped water. The velocity of the pig may be between 0 m/s and 2 m/s. The water flow rate provided by the pump can then depend upon the diameter required to reach the required pig velocity. More particularly, step (f) may comprise pushing the pig from the pig starting point to the pig finishing point with the pumped water. Thus, in step (f), the pig may push the fluid in the pipe downstream towards, more particularly back into, the subsea equipment. In this way, the pipe can be emptied of fluid. This can allow the empty pipe to be retrieved from the sea floor to a topside vessel.

Laying step (b) may be carried out using standard installation methods with, for example, a Vertical Laying System (VLS). This equipment, which is used offshore during installation of flexible pipes, sets the flexible pipe in vertical position before application of crushing loads with caterpillar. This enables the installation of flexible pipes with a very high top tension whilst avoiding crushing the flexible pipe on a gutter or a pulley. If short enough, the flexible pipe can be lowered by a crane or winch with a connection point on one end. In particular, laying step (b) may comprise lowering a skid as described above. This skid may include rigging. The apparatus may also comprise a quick release mechanism for allowing fast disconnection of the apparatus from the subsea equipment in case of emergency. Connecting step (d) may be carried out by a remotely operated underwater vehicle (ROV). In particular, connecting step (d) may comprise connecting the skid to the pipe. This connection may be via a flying lead, generally of a smaller diameter than the pipe, which may be carried out using an ROV. Flying leads are generally used when the pipe is too big and heavy (eg 1 km in length) to be efficiently moved using an ROV. The flying leads are easier to manipulate and can therefore improve the connecting step. The flying leads connector may be a standard connector, which may be rated to withstand 300 bar pressure, or more. Alternatively, the skid and pipe may be connected prior to laying step (b). In step (d), the connecting may be by hot stab (ie a device which is connectable to a pipeline during production). By way of example, there are two API specifications relating to the design and manufacture of ROV hot stabs and receptacles. These are API 17H ($2^{nd}$ Edition, June 2013) and API 17D ($2^{nd}$ Edition, May 2011). In particular, the hot stab may comprise a first end provided with a handle, a second end provided with a tip, and a body between the two ends. More particularly, the handle may be t-shaped (eg comprising a bar roughly at 90 degrees to the major axis of the body, and connected at approximately halfway along its length to the body). The tip of the hot stab may be removable. The tips are normally used to reduce the possibility of damage to the receptacle (ie the part that the hot stab connected to) in the event of an off-angle insertion. Alternatively, the subsea equipment may comprise a pressure cap and in step (d) the connecting may comprise removing the pressure cap. The pipe is laid on the seabed whilst the method for reducing the pressure of fluid within subsea equipment is carried out. After the method for reducing the pressure of fluid within subsea equipment has been performed, a step of disconnecting the apparatus from the subsea equipment may be carried out.

This invention also relates to a method of deploying an apparatus as described above, the method comprising the steps of: (a) providing a vessel carrying the apparatus, (b) laying the pipe on the sea floor, (c) transporting the rest of the apparatus to the pipe, and (d) connecting the pipe to the rest of the apparatus. This invention also relates to a method of connecting an apparatus as described above to subsea equipment, the method comprising the steps of: (a) providing the apparatus, (b) transporting the apparatus to the subsea equipment, and (c) connecting the apparatus to the subsea equipment using the connector. In relation to the method of deploying the apparatus, the rest of the apparatus may be in the form of a single unit, also known as a skid. The single unit or skid may be as described above. In step (d), the connecting may be carried out by a ROV. In the step (d), the connecting may comprise connecting the single unit or skid to the pipe. The method of deploying the apparatus may be carried out prior to the method for connecting the apparatus to subsea equipment as described above. A step of disconnecting the apparatus from the subsea equipment may be carried out after either the method of deploying the apparatus or the method for connecting the apparatus. After the step of disconnecting the apparatus from the subsea equipment has been performed, a step of retrieving the apparatus to the vessel may be carried out. The pipe may be disconnected from the skid (when present) using a ROV. The pipe may then be lifted by the Pipe Laying Support Vessel (PLSV) vessel. The step of retrieving the apparatus may comprise reeling the pipe onto a reel or, for a flexible pipe, onto a carousel. One end of the pipe may be equipped with a pulling head. This can be added by ROV. More particularly, the pulling head may then be connected to a lifting rod from a winch. The winch may then be wound until the pipe reaches the vessel. The end of the pipe may then be disconnected from the winch rope and connected to the reel or the carousel and then reeled onto the reel or into the carousel. Any flying leads may be disconnected from the subsea equipment using an ROV. The skid (when used) may be connected to a lifting rope using an ROV. The skid may then be recovered with its flying leads by lifting. Any removed subsea equipment caps can then be put back into place using an ROV.

Figure 1:
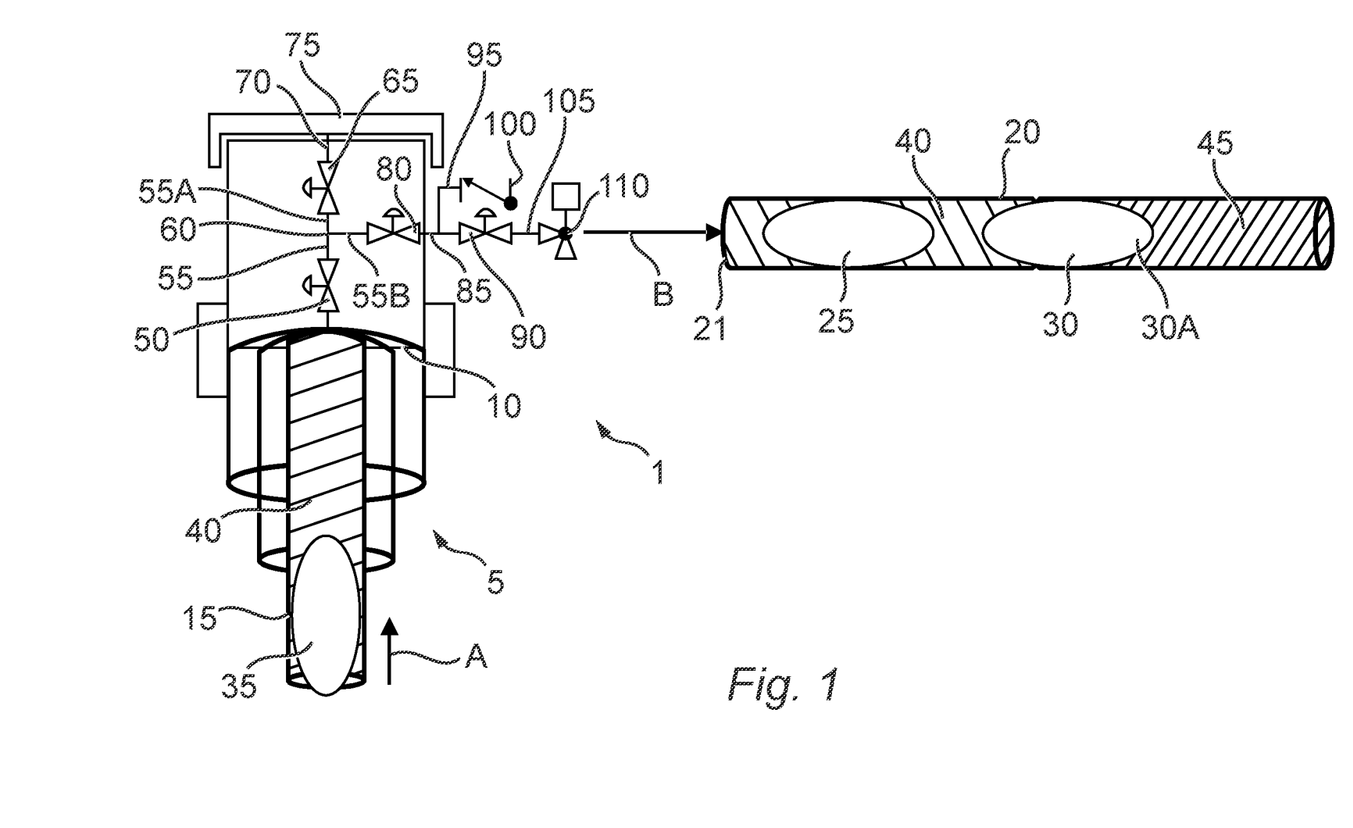
FIG. 1 shows a plugged flowline, Christmas Tree and wellbore with a topside depressurisation.

FIG. 1 shows subsea equipment 1 when plugged by hydrate. The subsea equipment 1 comprises Christmas tree 5 which is connected at its lower end 10 to the wellbore 15. During normal use, the fluid flows through wellbore 15 in the direction of arrow A, into Christmas tree 5, through tubing and valves within the Christmas Tree 5 (described in more detail below), and out from Christmas Tree 5 in the direction of arrow B through production line 20 to a production facility (not shown). Production line 20 comprises a first end 21 which is connected to Christmas Tree 5, and a second end (not shown) which connects to the production facility.

In FIG. 1, three hydrate plugs have formed within subsea equipment 1. First hydrate plug 25 is formed in production line 20 close to the first end 21. Second hydrate plug 30 is also formed in production line 20, but at a distance further from first end 21 than that first hydrate plug 25. In addition, third hydrate plug 35 is formed in wellbore 15.

As described above, hydrate plugs form in cold (typically around 4° C. for deep water and around 10° C. for shallow water), high pressure environments. In the subsea equipment 1 depicted in FIG. 1, the fluid 40 (indicated by solidly filled sections) to the left of second hydrate plug 30 is under a relatively higher pressure (typically around 300 bar, although it can be as high as 600 bar) which is sufficient for the hydrate plugs 25, 30, 35 to form. In addition, the hydrate plugs 25, 30, 35 do not dissociate at this pressure. The fluid 45 (indicated by hatched section) to the right of second hydrate plug 30 is in the part of the subsea equipment 1 that is connected to the production facility. This fluid 45 is under a relatively lower pressure than fluid 40, this lower pressure (normally between 1 bar and 10 bar) being low enough to allow the end 30A of the second hydrate plug 30 that is in contact with the fluid 45 to dissociate.

The Christmas Tree 5 comprises an inlet from wellbore 15 through which the fluid 40 from the well (not shown) enters Christmas Tree 5. The wellbore 15 terminates at its connection with first production master valve 50. The fluid path through Christmas Tree 5 continues from first production master valve 50 through tubing 55. The tubing 55 splits into two branches 55A and 55B at junction 60. Tubing 55A continues to production swab valve 65 within the Christmas Tree 5. From production swab valve 65, tubing 70 continues to tree cap 75 through which the tubing 70 can provide fluid connection to other subsea equipment (not shown).

Tubing 55B continues to second production master valve 80 within the Christmas Tree 5. From second production master valve 80, tubing 85 exits Christmas Tree 5. Tubing 85 continues to production wing valve 90. Between the point at which tubing 85 exits Christmas Tree 5 and production wing valve 90, methanol injection tubing 95 is connected to tubing 85. At the opposite end of methanol injection tubing 95 to the connection to tubing 85, there is provided methanol injection gate valve 100. Methanol injection gate valve 100 is normally connected to a source of methanol such as a vessel on the surface of the sea (not shown).

From production wing valve 90, the path of fluid flow continues via tubing 105 to production choke valve 110. From production choke valve 110 the fluid path continues through production line 20 to the production facility (not shown).

Figure 2:
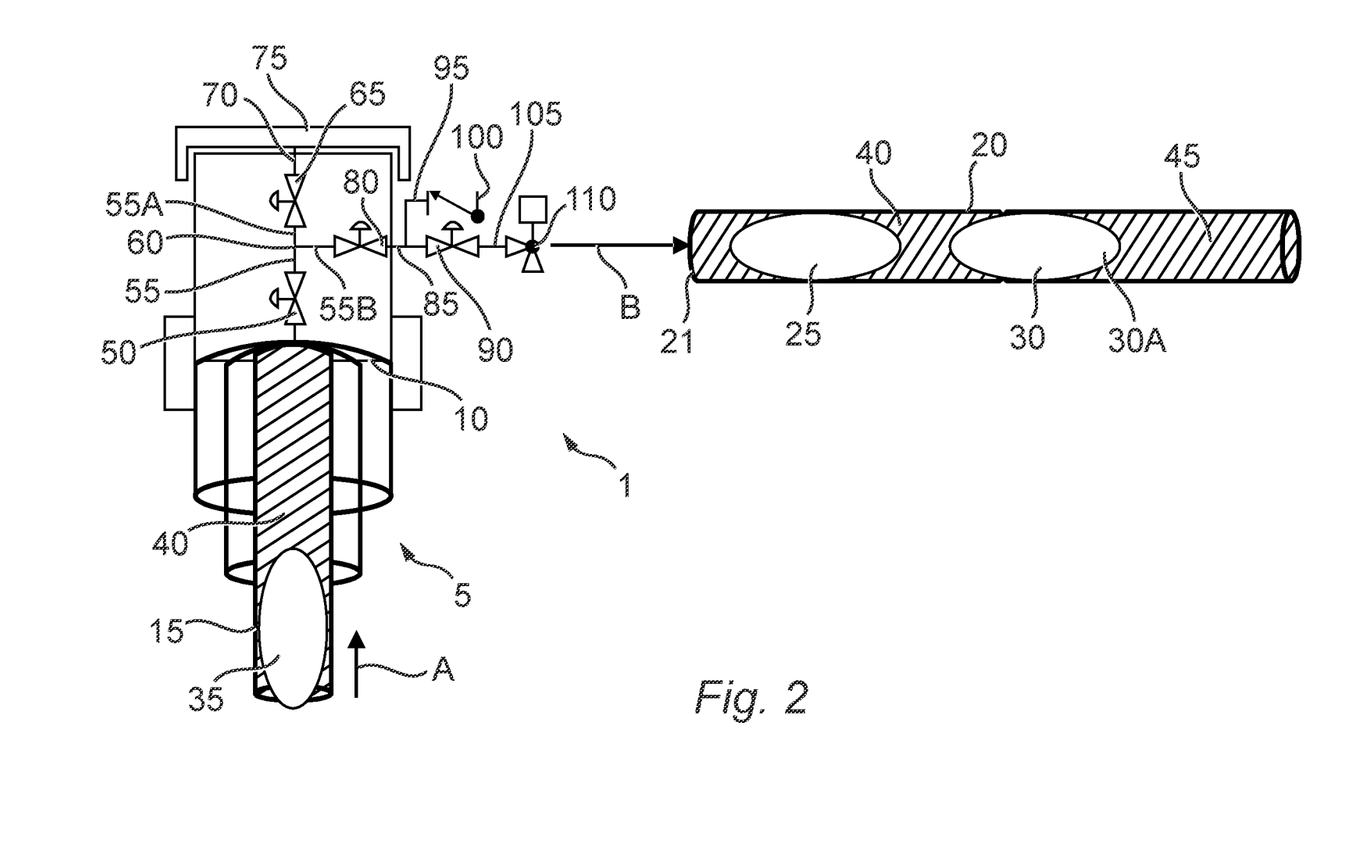
FIG. 2 shows the plugged flowline, Christmas Tree and wellbore with depressurisation at the high pressure side.

FIG. 2 is identical to FIG. 1 except that the pressure of fluid 40 has been reduced (indicated by hatching) to a level such that all hydrate plugs 25, 30, 35 are able to dissociate.

Figure 3:
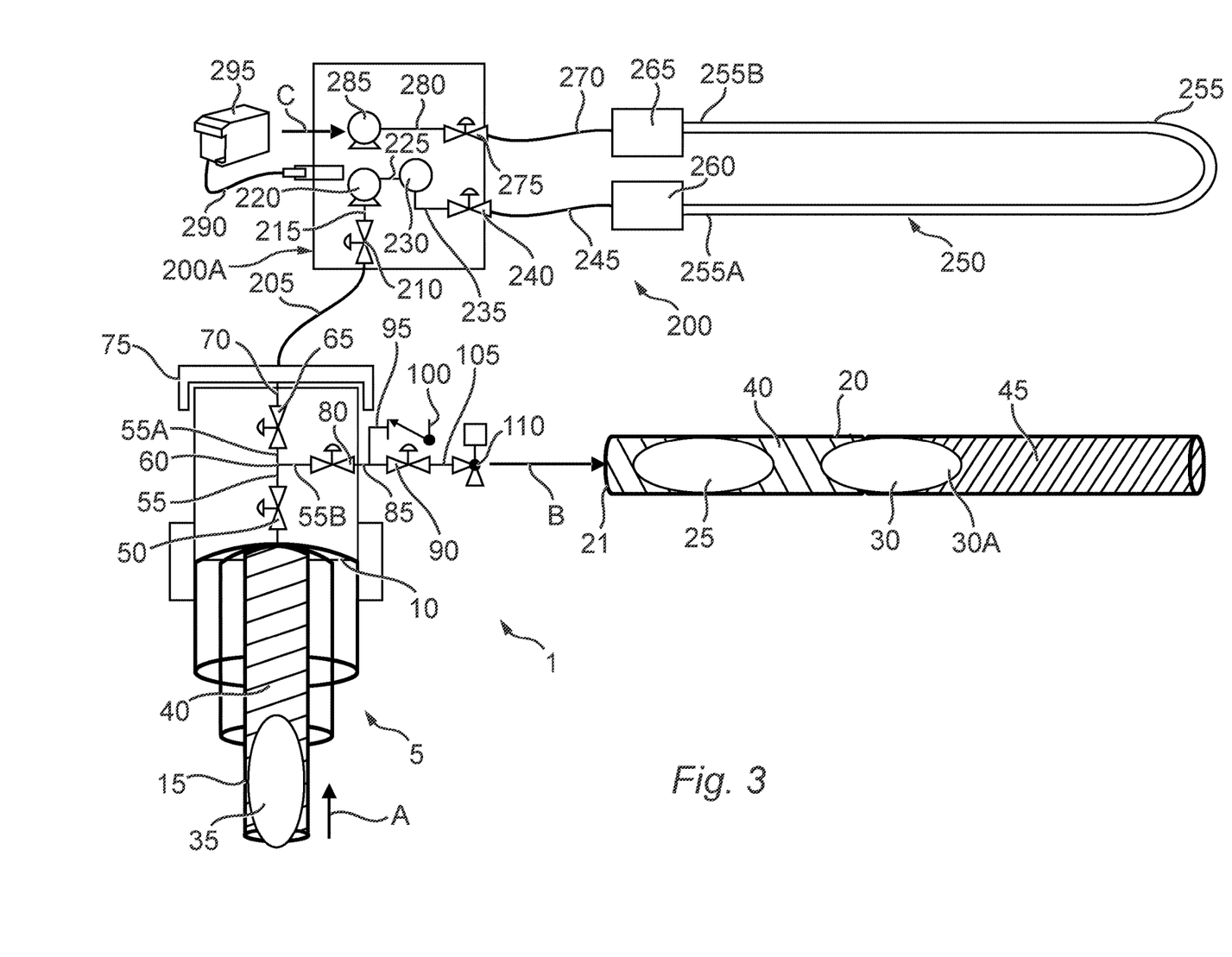
FIG. 3 shows apparatus according to one embodiment of the invention connected to the plugged flowline, Christmas Tree and wellbore.

FIG. 3 shows depressurisation apparatus 200 when connected to subsea equipment 1. The subsea equipment 1 is in the condition depicted in FIG. 1, ie the fluid 40 (indicated by solidly filled sections) to the left of second hydrate plug 30 is under a relatively higher pressure which is sufficient for the hydrate plugs 25, 30, 35 to form.

Depressurisation apparatus 200 is connected to Christmas Tree 5 via a first end of connector flying lead 205 which provides fluid communication through tree cap 75. Connector flying lead 205 may be in the form of a flexible pipeline bundle. It would generally be rated for high pressure (<300 bar), having a small diameter (1-4 inches). The second end of connector flying lead 205 is connected to isolation valve 210, which is typically a choke valve. The fluid path through depressurisation apparatus 200 continues from choke valve 210 via tubing 215 to extraction pump 220. Extraction pump 220 is a low flow rate (<20 gpm) and high pressure pump (>300 bar). Extraction pump 220 can pump fluid consisting of 100% gas or 100% liquid, or a mixture of gas and liquid. An example of a suitable pump is an ASPIC pump, which is a double piston pump with an alternate elliptical motion. An alternative suitable pump is a lobe pump.

The fluid path continues from extraction pump 220 through tubing 225 to multiphase flow meter 230. From flow meter 230, tubing 235 connects to depressurisation valve 240, which is normally a choke valve. The fluid path continues from depressurisation valve 240 through downstream flying lead 245 to storage apparatus 250.

Figure 5:
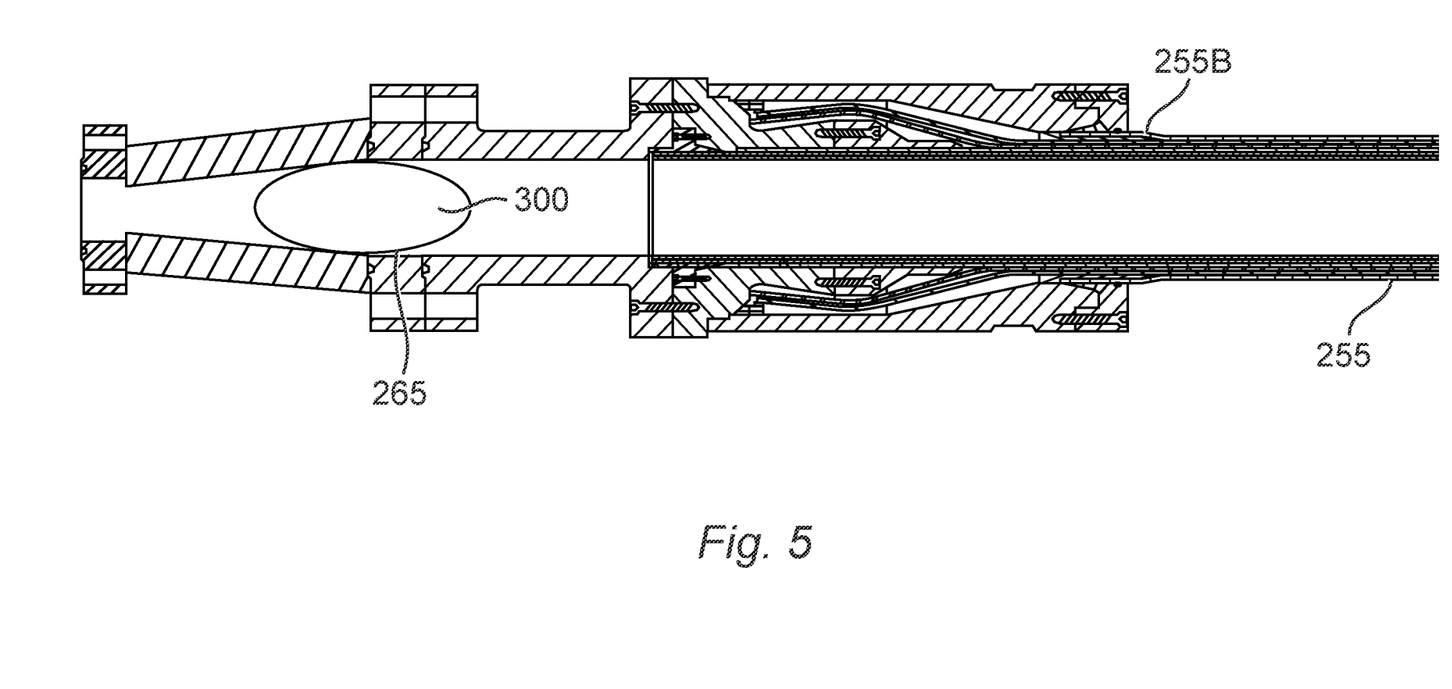
FIG. 5 shows an expanded view of the pig starting point of the apparatus according to one embodiment of the invention.

Storage apparatus 250 comprises a flexible storage pipe 255 having a first end 255A which is connected via a pig finishing point 260 to downstream flying lead 245. The flexible storage pipe 255 has a second end 255B which is connected to upstream flying lead 270 via a pig starting point 265. An expanded view of pig starting point 265 is shown in FIG. 5. As depicted, pig 300 is provided in pig starting point 265. Upstream of pig starting point 265 there is provided narrowed section 265A. Narrowed section 265A has a diameter narrower than that of pig 300 in order to limit the movement of pig 300 in an upstream direction. A similarly narrowed section is provided downstream of pig finishing point 260.

The fluid path through depressurisation apparatus 200 continues through upstream flying lead 270 to pigging valve 275. Pigging valve is connected via tubing 280 to water pump 285. Water pump then connects to the external seawater through a water intake indicated by arrow C.

In the embodiment of the invention shown in the Figures, choke valve 210, extraction pump 220, multiphase flow meter 230, depressurisation valve 240, pigging valve 275, water pump 285, and tubings 215, 225, 235 and 280, are contained within a single unit (or skid) 200A. Depressurisation valve 240 and pigging valve 275 are provided on the same side of skid 200A. Flexible storage pipe 255 is bent into a u-shape such that first end 255A can easily be connected via a pig finishing point 260 to depressurisation valve 240 using downstream flying lead 245. Similarly, second end 255B can easily be connected via a pig starting point 265 to pigging valve 275 using upstream flying lead 270.

Power and electrical control of the depressurisation apparatus 200 are provided through wiring 290 by controller 295 to skid 200A. In terms of its dimensions, the length, width and height of the skid 200A can each be from 1 m to 10 m. The controller 295 opens and closes the valves of depressurisation apparatus 200, measures pressure and temperature in order to allow detection of an unsafe condition, as well as providing power to the pumps 220, 285. Power can be supplied by an ROV (not shown) or a dedicated umbilical connected to a topside vessel (not shown). Alternatively, subsea batteries could be used. The skid 200A can be installed on the seabed using a crane and lifting means. For this purpose the skid 200A can be provided with lifting eyelets (not shown). The skid 200A can also comprise ROV engaging means (not shown) so that the ROV can be used to help position the skid 200A on the seabed.

In order to depressurise the subsea equipment 1, the choke valve 210 and depressurisation valve 240 are opened. Within Christmas Tree 5, one or more of the first production master valve 50, production swab valve 65, production master valve 80, production wing valve 90 and production choke valve 110 are in their open positions. The choice of which valves to open depends upon the location of the hydrates and which valves need to be opened in order to provide access to the associated fluid. In this way, the pressurised fluid 40 from the wellbore 15, the tubing inside Christmas Tree 5 and the production line 20 can flow through depressurisation apparatus 200 via flying leads 205 and 245, via multiphase flow meter 230, into storage apparatus 250.

Multiphase flow meter 230 measures the amount of fluid that flows through it into storage apparatus 250. This information is used to calculate the pressure within storage apparatus 250 so that it can be maintained at a level which can avoid hydrates forming inside the storage apparatus 250. To assist with this, an inhibitor such as methanol or methyl ethylene glycol is added to the fluid, preferably in amount that provides a 30% by volume dilution of the inhibitor within the fluid. The inhibitor (methanol in this case) can be provided via methanol injection gate valve 100 a methanol injection tubing 95. Methanol injection gate valve 100 is connected to a topside methanol supply via an umbilical (not shown). Alternatively, the inhibitor can be supplied via the Christmas Tree 5 or a subsea storage container (not shown).

Figure 4:
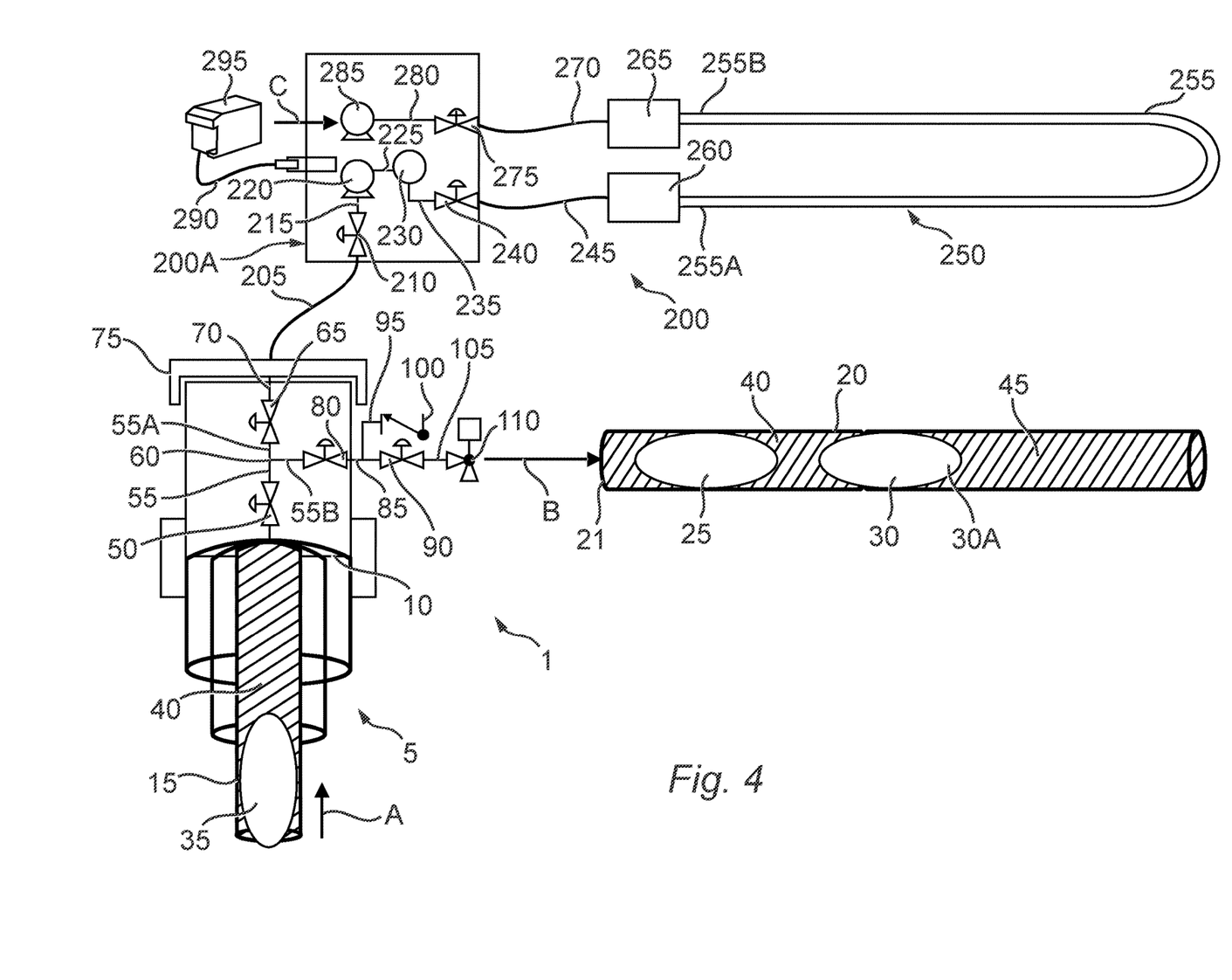
FIG. 4 shows the depressurisation of the plugged flowline, Christmas Tree and wellbore with the apparatus according to one embodiment of the invention.

Once a pressure equilibrium is reached between the fluid 40 in the subsea equipment 1 and that in depressurisation apparatus 200, extraction pump 220 is activated so that additional fluid is pumped from subsea equipment 1 into storage apparatus 250. The pressure of the fluid 40 is therefore lowered within subsea equipment 1, allowing hydrate plugs 25, 30, 35 to dissociate. FIG. 4 shows the same view as FIG. 3 once this depressurisation step has been carried out. The reduced pressure of fluid 40 is indicated in FIG. 4 by hatching. Pigging valve 275 is closed such that, as a result of the use of extraction pump 220 the fluid within depressurisation apparatus 200 between extraction pump 220 and pigging valve 275 is pressurised.

Optionally, at this stage an accelerated dissociation procedure can be carried out in order to assist in completely dissociating hydrate plugs 25, 30, 35. This can be done by adding additional quantities of an inhibitor (methanol or methyl ethylene glycol) or by circulation of hot dead oil (ie an oil that does not contain, under 1 bar, any dissolved gas or volatile components).

Once the hydrate plugs 25, 30, 35 have been removed, the fluid within depressurisation apparatus 200 which has been removed from subsea equipment 1 is returned to the subsea equipment 1. This is done by using pig 300 which is housed at pig starting point 265 (see FIG. 5). Pigging valve 275 is opened and pigging pump 285 is activated. Sea water is drawn in through the pigging pump 285 via the water intake indicated by arrow C. The water flows through pigging valve 276 and upstream flying lead 270 to pig launching area 265. The sea water drives the pig 300 from pig starting point 265, along flexible storage pipe 255 to pig finishing point 260. This movement of the pig 300 pushes the fluid back through depressurisation apparatus 200, via connector flying lead 205 and back into subsea equipment 1 via Christmas Tree 5.

Once the above procedure has been completed, the depressurisation apparatus 200 can be disconnected from subsea equipment 1. The depressurisation apparatus 200 can then be recovered to a topside vessel (not shown).

The invention claimed is:

1. A method for reducing the pressure of fluid within subsea equipment, the method comprising the steps of:
   (a) providing a flexible pipe, a pump connected to the flexible pipe, and a pig within the flexible pipe,
   (b) laying the flexible pipe on the sea floor,
   (c) providing a connector,
   (d) connecting the flexible pipe to the subsea equipment via the connector,
   (e) extracting fluid from the subsea equipment through the connector and into the flexible pipe,
   (f) after step (e), pumping the fluid in the flexible pipe through the connector and to the subsea equipment by pushing the pig along the flexible pipe from a pig starting point to a pig finishing point.

2. The method as claimed in claim 1, wherein step (e) further comprises pumping the fluid from the subsea equipment through the connector and into the pipe.

3. The method as claimed in claim 1, wherein step (e) additionally comprises measuring the amount of fluid extracted from the subsea equipment through the connector and into the flexible pipe.

4. The method as claimed in claim 1, wherein step (e) additionally comprises adding a hydrate formation inhibitor to the fluid being extracted.

5. The method as claimed in claim 1, further comprising (g) recovering the flexible pipe to a topside vessel after step (f).

* * * * *